(12) United States Patent
Kakuta et al.

(10) Patent No.: US 12,522,743 B2
(45) Date of Patent: Jan. 13, 2026

(54) PRINTING FOUNDATION

(71) Applicant: Murata Manufacturing Co., Ltd., Nagaokakyo (JP)

(72) Inventors: Ryuki Kakuta, Nagaokakyo (JP); Takahiro Hirao, Nagaokakyo (JP); Manabu Sakai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 473 days.

(21) Appl. No.: 18/097,612

(22) Filed: Jan. 17, 2023

(65) Prior Publication Data

US 2023/0151240 A1     May 18, 2023

Related U.S. Application Data

(63) Continuation of application No. PCT/JP2021/025098, filed on Jul. 2, 2021.

(30) Foreign Application Priority Data

Jul. 22, 2020   (JP) ................................. 2020-125003

(51) Int. Cl.
 *C09D 11/00* (2014.01)
 *C09D 11/54* (2014.01)
(52) U.S. Cl.
 CPC .................... *C09D 11/54* (2013.01)

(58) Field of Classification Search
 CPC ........................................................ C09D 11/54
 USPC ........................... 106/31.01, 31.13, 31.57
 See application file for complete search history.

(56) References Cited

U.S. PATENT DOCUMENTS

| 2003/0167634 A1 | 9/2003 | Nakao |
| 2015/0289383 A1 | 10/2015 | Yoshihara et al. |
| 2019/0267192 A1 | 8/2019 | Sato et al. |

FOREIGN PATENT DOCUMENTS

| JP | 4300801 B2 | 7/2009 | |
| JP | 2014067952 A | * 4/2014 | |
| JP | 2018137325 A | 8/2018 | |
| JP | 2019106400 A | 6/2019 | |
| JP | 2019149414 A | 9/2019 | |
| JP | 6744672 B1 | * 8/2020 | ............. D21H 19/20 |
| WO | 2014142008 A1 | 9/2014 | |

OTHER PUBLICATIONS

International Search Report in PCT/JP2021/025098, mailed Sep. 14, 2021, 3 pages.
Written Opinion in PCT/JP2021/025098, mailed Sep. 14, 2021, 3 pages.

* cited by examiner

*Primary Examiner* — James E Mcdonough
(74) *Attorney, Agent, or Firm* — Keating & Bennett, LLP (57) ABSTRACT

A printing foundation includes a support having a porous structure and a functional layer in contact with the support and including a plurality of resin particles including a surface at least portion of which is covered by polyvinyl alcohol.

15 Claims, 4 Drawing Sheets

PRINTING FOUNDATION

CROSS REFERENCE TO RELATED APPLICATIONS

This application claims the benefit of priority to Japanese Patent Application No. 2020-125003 filed on Jul. 22, 2020 and is a Continuation Application of PCT Application No. PCT/JP2021/025098 filed on Jul. 2, 2021. The entire contents of each application are hereby incorporated herein by reference.

BACKGROUND OF THE INVENTION

1. Field of the Invention

The present invention relates to a printing foundation for performing printing by using an ink.

2. Description of the Related Art

In a known method, a ceramic electronic component such as a multilayer ceramic capacitor is produced through printing by using a 3D printer. If an ink blurs during printing, a ceramic electronic component having a predetermined shape cannot be produced.

Japanese Patent No. 4300801 discloses a method in which, to suppress such ink blurring from occurring, a PVA (polyvinyl alcohol) aqueous solution is applied to the surface of a ceramic green sheet so as to form a PVA layer, and printing is performed on the PVA layer by using a water-based ink in which a solvent is water. It is disclosed that, according to this printing method, the water-based ink gelling due to a reaction with a resin in the PVA layer enables ink blurring to be suppressed from occurring.

Regarding the printing method described in Japanese Patent No. 4300801, an effect of suppressing ink blurring from occurring is exerted when the water-based ink is used, but when a solvent-based ink in which the solvent is an organic solvent is used, a gelling reaction does not occur, and an effect of suppressing ink blurring from occurring is not exerted.

SUMMARY OF THE INVENTION

Preferred embodiments of the present invention provide printing foundations each of which is able to reduce or prevent ink blurring from occurring not only when a water-based ink is used but also when a solvent-based ink is used as an ink used for printing.

A printing foundation according to a preferred embodiment of the present invention includes a support having a porous structure, and a functional layer in contact with the support and including a plurality of resin particles including a surface at least a portion of which is covered by polyvinyl alcohol.

According to preferred embodiments of the present invention, a solvent of an ink is absorbed between the resin particles in the functional layer and into the support having a porous structure during printing. Therefore, blurring can be reduced or prevented from occurring regardless of whether an ink is a water-based ink or a solvent-based ink.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

The features of the present invention will be described below with reference to the preferred embodiments according to the present invention and the drawings.

Printing foundations according to preferred embodiments of the present invention each define and function as a foundation on which printing is performed using an ink. Printing may be performed by any suitable method for producing any material. As an example, a ceramic electronic component such as a multilayer ceramic capacitor is produced on a printing foundation according to a preferred embodiment of the present invention through printing by using a 3D printer. When a multilayer ceramic capacitor is produced, a dielectric layer ink, an inner electrode ink, an outer electrode ink, and the like are prepared.

Figure 1:
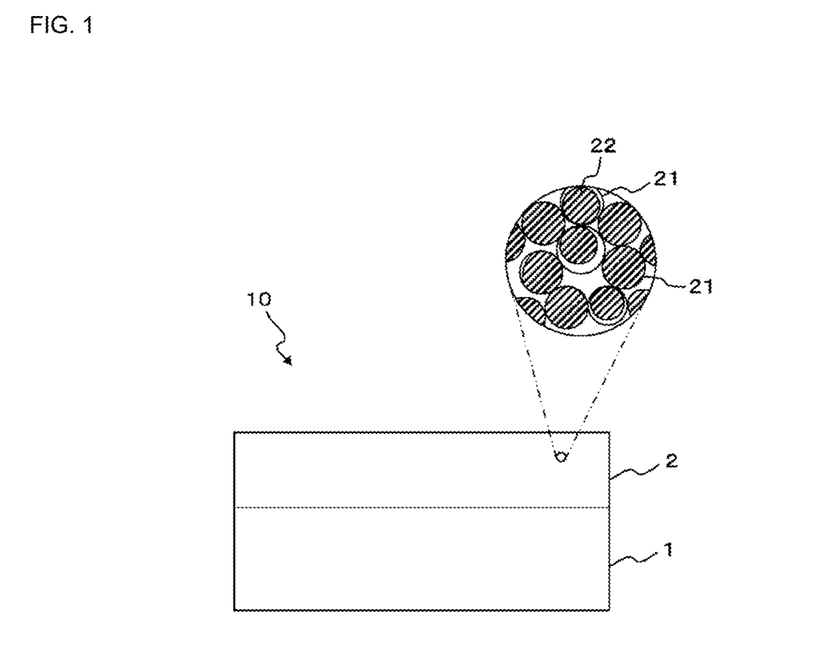
FIG. 1 is a schematic side view illustrating a printing foundation according to a preferred embodiment of the present invention.

FIG. 1 is a schematic side view illustrating a printing foundation 10 according to a preferred embodiment of the present invention. The printing foundation 10 according to a preferred embodiment includes a support 1 having a porous structure and a functional layer 2 that is in contact with the support 1 and that includes a plurality of resin particles 21 including a surface at least a portion of which is covered by polyvinyl alcohol (hereafter referred to as PVA) 22.

The support 1 is a porous structure including a plurality of pores in the interior and on the surface and is, for example, a firing sagger. The support 1 is made of, for example, a material including aluminum oxide denoted by a chemical formula $Al_2O_3$ as a main component. According to another configuration example, the support 1 is made of, for example, a material including mullite denoted by a chemical formula $3Al_2O_3 \cdot 2SiO_2$ as a main component. Mullite is a compound of aluminum oxide ($Al_2O_3$) and silicon dioxide ($SiO_2$). According to another configuration example, the support 1 is made of, for example, a material including cordierite denoted by a chemical formula $2MgO \cdot 2Al_2O_3 \cdot 5SiO_2$ as a main component. Cordierite is a compound of magnesium oxide (MgO), aluminum oxide ($Al_2O_3$), and silicon dioxide ($SiO_2$). The support 1 may include, for example, secondary components and impurities in an amount that does not change the characteristics.

Figure 2:
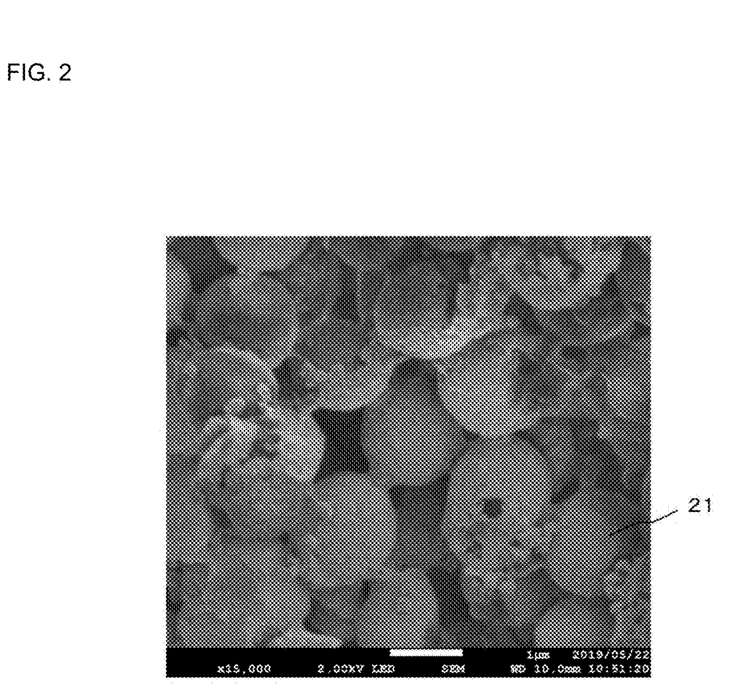
FIG. 2 is an image when a functional layer is observed using a scanning electron microscope.

As illustrated in FIG. 1, a plurality of resin particles 21 defining the functional layer 2 include resin particles including a surface entirely or substantially entirely covered by PVA 22 and resin particles including a surface partially covered by PVA 22. In this regard, resin particles including a surface not covered by PVA 22 may be included in the functional layer 2. FIG. 2 is an image when a functional layer 2 is observed using a scanning electron microscope (SEM).

Figure 3A:
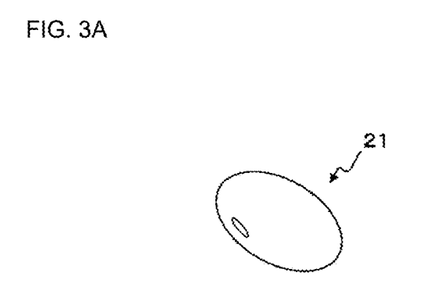
FIGS. 3A to 3G are diagrams illustrating various examples of the shape of a resin particle.
Figure 3B:
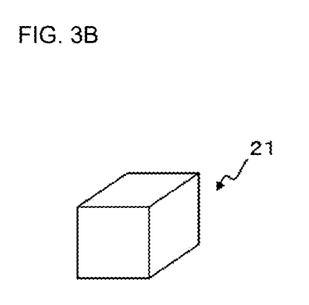
Figure 3C:
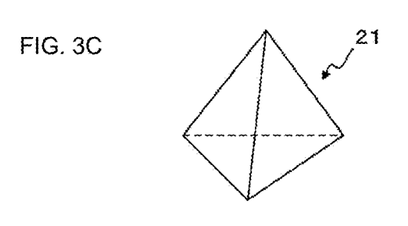
Figure 3D:
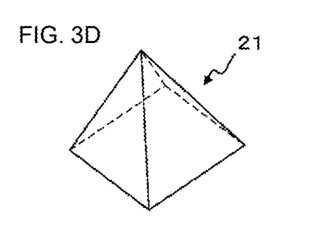
Figure 3E:
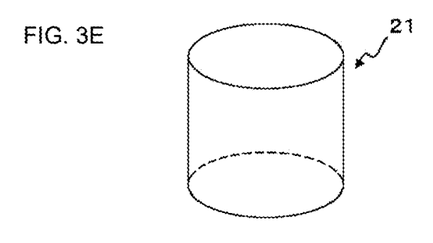
Figure 3F:
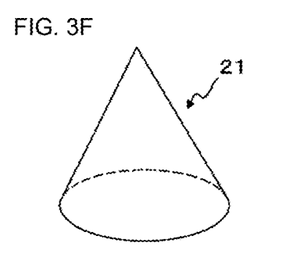
Figure 3G:
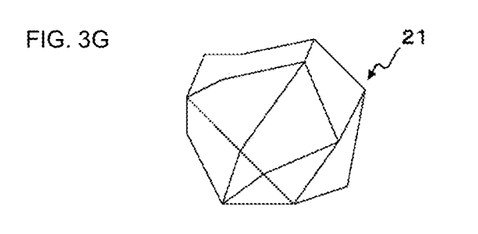

In the present preferred embodiment, the shape of the resin particle 21 is spherical or substantially spherical as illustrated in FIG. 1. Herein, the spherical or substantially spherical or substantially spherical shape includes shapes that appear to be spherical overall regardless of including a distortion, a dent, or the like. In this regard, the shape of the resin particle 21 is not limited to spherical or substantially spherical. For example, the shape of the resin particle 21 may be a spheroid obtained by rotating an ellipse about the major axis or the minor axis defining and functioning as the axis of rotation (refer to FIG. 3A), a rectangular or substantially rectangular parallelepiped (refer to FIG. 3B), a triangular or substantially triangular pyramid (refer to FIG. 3C), a quadrangular or substantially quadrangular pyramid (refer to FIG. 3D), a cylindrical or substantially cylindrical column (refer to FIG. 3E), a circular or substantially circular cone (refer to FIG. 3F), or an irregular shape (refer to FIG. 3G). That is, the shape of the resin particle 21 is not particularly limited.

The resin particle 21 is made of, for example, an acrylic resin, a cellulose resin, or a polyvinyl butyral resin. As an example, the resin particle 21 is made of a methyl methacrylate-ethylene glycol dimethacrylate copolymer ($\{CH_2C(CH_3)COOCH_3\}_m \cdot \{CH_2C(CH_3)COOCH_2CH_2OOC(CH_3)CCH_2\}_n$).

PVA 22 may include, for example, impurities such as methanol and methyl acetate.

The resin particle 21 in the functional layer 2 is connected to an adjacent resin particle 21 due to PVA 22 covering the surface of the particle 21. When the shape of the resin particle 21 is spherical or substantially circular, the average particle diameter of the resin particles 21 is, for example, about 1 μm. In addition, the thickness of the functional layer 2 in the stacking direction of the support 1 and the functional layer 2 is, for example, about 10 μm.

In this regard, the particle diameter of the solid content in the ink applied to the printing foundation 10, in particular, to the functional layer 2 is, for example, 100 nm or more and 500 nm or less.

When printing is performed on the printing foundation 10 according to a preferred embodiment of the present invention, a solvent of an ink is absorbed between the resin particles 21 in the functional layer 2 and into the support 1 having a porous structure. Therefore, ink blurring when the ink including a solvent is used can be reduced or prevented from occurring regardless of whether the ink is a water-based ink or a solvent-based ink.

Regarding the method for producing a ceramic electronic component in the related art, after an unfired ceramic element is produced by performing printing on a printing stage, the unfired ceramic element is peeled off the printing stage and is moved onto a firing sagger. Regarding another method, after an unfired ceramic element is produced by placing an intermediate material such as, for example, ink jet paper on a printing stage and performing printing thereon, the unfired ceramic element and the ink jet paper are moved onto a firing sagger. Subsequently, the firing sagger is placed in a firing oven and fired so as to obtain a ceramic electronic component.

On the other hand, when the printing foundation 10 according to the present preferred embodiment is used, a ceramic electronic component can be obtained by performing printing on the printing foundation 10 so as to produce an unfired ceramic element and thereafter placing the printing foundation 10 into a firing oven so as to perform firing. Therefore, since there is no need to move the unfired ceramic element that is a printed material, the production steps are simplified and the production time can be reduced.

Method for Producing Printing Foundation

Figure 4:
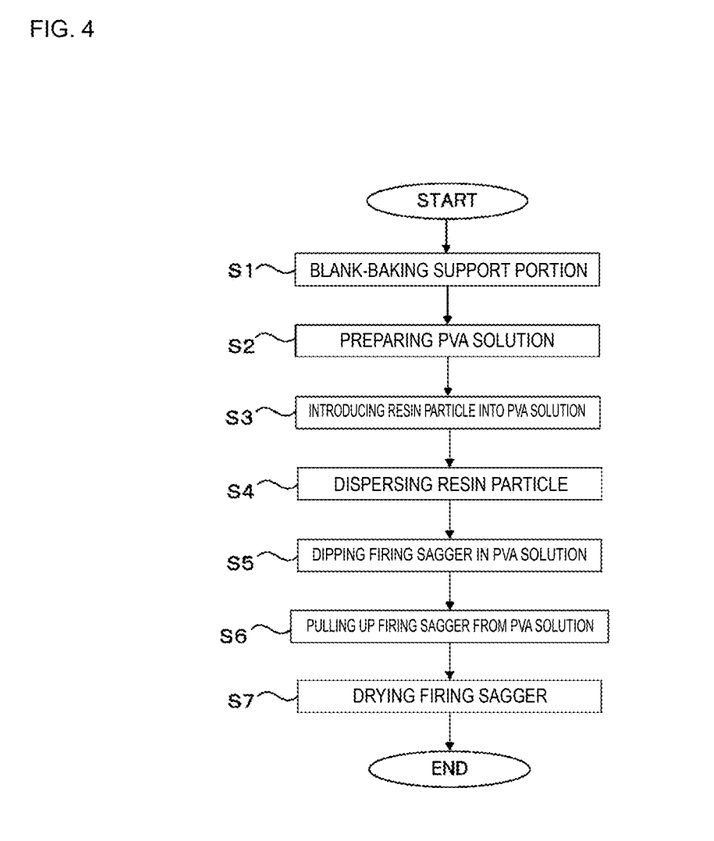
FIG. 4 is a flow chart illustrating an example of a method for producing a printing foundation 10 according to a preferred embodiment of the present invention.

FIG. 4 is a flow chart illustrating a non-limiting example of a method for producing the printing foundation 10 according to a preferred embodiment of the present invention.

In Step S1, a prepared support 1 is blank-baked so as to remove impurities. Herein, an example in which a firing sagger is used as the support 1 is described. The blank baking is performed, for example, at about 950° C. for about 3 hours.

In Step S2 following Step S1, PVA is dissolved in water so as to produce a PVA solution. The ratio of PVA to the water in the PVA solution on a % by weight basis is, for example, PVA:water=about 5:95.

In Step S3 following Step S2, the resin particles are introduced into the PVA solution. The ratio of the PVA solution to the resin particles on a % by volume basis is, for example, about 1:1.

In Step S4 following Step S3, the PVA solution including the resin particles is agitated so as to disperse the resin particles. For example, an agitator "ARE-500" produced by THINKY CORPORATION is used, and agitation is performed under the conditions of a rotational speed of about 1,000 rpm and an agitation time of about 10 min.

In Step S5 following Step S4, the firing sagger is dipped in the PVA solution. The dipping time of the PVA solution is, for example, about 2 sec to about 3 sec.

In Step S6 following Step S5, the firing sagger is pulled up from the PVA solution and left to stand for, for example, about 20 sec until the PVA solution does not drip spontaneously.

In Step S7 following Step S6, a droplet of the PVA solution attached to the lower portion of the firing sagger is wiped with wastes or the like, and thereafter the firing sagger is dried by being left to stand.

According to the above-described steps, the printing foundation 10 in which the functional layer 2 is formed on the support 1 is obtained.

In this regard, in the above-described example of a production method, the functional layer 2 is formed on the surface of the support 1 by dipping the firing sagger defining and functioning as the support 1 in the PVA solution including resin particles. However, the method for forming the functional layer 2 is not limited to the dipping method. For example, the surface of the support 1 may be printed with the PVA solution including resin particles by a method of ink jet printing, dispenser printing, spray printing, screen printing, gravure printing, or the like.

Example 1

A plurality of printing foundations 10 which differ from each other in the thickness of the functional layer 2 were produced, and the characteristics were examined. Herein, five types of printing foundations 10 which differ from each other in the thickness of the functional layer 2, the thickness being about 1 μm, about 5 μm, about 10 μm, about 30 μm, or about 100 μm, were prepared, and ink blurring, intrusion of the ink solid content into the support 1, and peeling of the printed material from the functional layer 2 were examined. The five types of printing foundations 10 were the printing foundation 10 according to the above-described preferred embodiment of the present invention including the support 1 and the functional layer 2. The characteristics of the five types of printing foundations 10 are presented in Table 1.

TABLE 1

|  | Blurring | Ink intrusion | Peeling |
|---|---|---|---|
| 1 μm | ○ | ○ | ⊙ |
| 5 μm | ⊙ | ⊙ | ⊙ |
| 10 μm | ⊙ | ⊙ | ⊙ |
| 30 μm | ⊙ | ⊙ | ⊙ |
| 100 μm | ⊙ | ⊙ | ○ |

In Table 1, when compared with a configuration without the functional layer 2, a printing foundation having an advantageous effect of reducing or preventing ink blurring from) occurring is rated as "○" which denotes "good", and a printing foundation having a particularly high advantageous effect of reducing or preventing ink blurring from occurring is rated as "⊙" which denotes "best". When compared with a configuration without the functional layer 2, a printing foundation with a low degree of intrusion of the ink solid content into the support 1 is rated as "○" which denotes "good", and a printing foundation with a particularly low degree of intrusion of the ink solid content into the support 1 is rated as "⊙" which denotes "best". When compared with a configuration without the functional layer 2, a printing foundation having a low degree of peeling of the printed material from the functional layer 2 is rated as "○" which denotes "good", and a printing foundation having a particularly low degree of peeling of the printed material from the functional layer 2 is rated as "⊙" which denotes "best".

As presented in Table 1, it was determined that all of the five types of printing foundations 10 which differ from each other in the thickness of the functional layer 2 have an advantageous effect of reducing or preventing ink blurring from occurring compared with the printing foundation without the functional layer 2 in the related art. In this regard, it was determined that when the thickness of the functional layer 2 was about 5 μm or more, a particularly high advantageous effect of reducing or preventing ink blurring from occurring was exerted. Therefore, in the printing foundation 10 according to the present preferred embodiment, the thickness of the functional layer 2 is preferably, for example, about 5 μm or more to further reduce or prevent the ink from blurring.

In addition, as presented in Table 1, it was determined that, regarding all of the five types of printing foundations 10 which differ from each other in the thickness of the functional layer 2, a low degree of intrusion of the ink solid content into the support 1 occurred compared with the printing foundation without the functional layer 2 in the related art. The ink solid content remaining in the support 1 may complicate disposal of the printing foundation. For example, when a metal that is an ink solid content intrudes into the support 1 and is disposed of without being processed, an environmental problem may occur in accordance with, for example, the amount of the metal. However, according to the printing foundation 10 of the present preferred embodiment, since intrusion of the ink solid component into the support 1 can be reduced, an environmental problem and the like with respect to the disposal can be reduced or prevented from occurring.

In addition, as presented in Table 1, when the thickness of the functional layer 2 is about 5 μm or more, the ink solid content does not readily reach the support 1, and intrusion into the support 1 is particularly reduced. Therefore, to further reduce or prevent the ink solid content from intruding into the support 1, the thickness of the functional layer 2 is preferably, for example, about 5 μm or more.

In this regard, when the unfired ceramic element and the printing foundation 10 are placed in a firing oven and fired, the resin particles 21 remain as soot. The ink solid content that intruded into the functional layer 2 is present in the soot. Therefore, the soot being disposed of enables the ink solid content to be simultaneously disposed of.

In addition, as presented in Table 1, it was determined that, regarding all of the five types of printing foundations 10 which differ from each other in the thickness of the functional layer 2, peeling of the printed material was reduced compared with the printing foundation without the functional layer 2 in the related art. The reason for this is assumed to be that, regarding the printing foundation 10 according to the present preferred embodiment, an anchor effect occurs due to the ink solid content intruding between resin particles 21 in the functional layer 2 so as to improve the adhesion of the printed material to the functional layer 2. In particular, since peeling of the printed material was particularly reduced when the thickness of the functional layer 2 was about 30 μm or less, the thickness of the functional layer 2 is preferably, for example, about 30 μm or less to suppress peeling of the printed material from occurring.

Example 2

A plurality of printing foundations 10 which differ from each other in the average particle diameter of resin particles 21 were produced, and the characteristics were examined. Herein, five types of printing foundations 10 which differ from each other in the average particle diameter, the average particle diameter being about 0.8 μm, about 1 μm, about 1.8 μm, about 5 μm, or about 10 μm and the shape of the resin particle 21 being spherical or substantially spherical, were prepared, and ink blurring, intrusion of the ink solid content into the support 1, and peeling of the printed material from the functional layer 2 were examined. The five types of printing foundations 10 were the printing foundation 10 according to the present preferred embodiment including the support 1 and the functional layer 2. The characteristics of the five types of printing foundations 10 are presented in Table 1. In this regard, in Table 2, "○" and "⊙" denote the same evaluation results as those in Example 1.

TABLE 2

|  | Blurring | Ink intrusion | Peeling |
|---|---|---|---|
| 0.8 μm | ⊙ | ⊙ | ○ |
| 1 μm | ⊙ | ⊙ | ⊙ |
| 1.8 μm | ⊙ | ⊙ | ⊙ |
| 5 μm | ○ | ○ | ⊙ |
| 10 μm | ○ | ○ | ⊙ |

As presented in Table 2, it was determined that all of the five types of printing foundations 10 which differ from each other in the average particle diameter of the resin particles 21 have an advantageous effect of suppressing ink blurring from occurring compared with the printing foundation without the functional layer 2 in the related art. In this regard, it was determined that when the average particle diameter of the resin particles 21 was about 1.8 μm or less, a particularly high advantageous effect of reducing or preventing ink blurring from occurring was provided. Therefore, in the printing foundation 10 according to the present preferred embodiment, the average particle diameter of the resin particles 21 in the functional layer 2 is preferably, for example, about 1.8 μm or less to further reduce or prevent the ink blurring from occurring.

In addition, as presented in Table 2, it was determined that, regarding all of the five types of printing foundations 10 which differ from each other in the average particle diameter of the resin particles 21, a low degree of intrusion of the ink solid content into the support 1 occurred compared with the printing foundation without the functional layer 2 in the related art. In addition, when the average particle diameter of resin particles 21 is about 1.8 μm or less, intrusion of the ink solid content into the support 1 is particularly reduced. Therefore, to further reduce or prevent the ink solid content from intruding into the support 1, the average particle diameter of the resin particles 21 is preferably, for example, about 1.8 μm or less.

In addition, as presented in Table 2, it was determined that, regarding all of the five types of printing foundations 10 which differ from each other in the average particle diameter of the resin particles 21, peeling of the printed material was reduced compared with the printing foundation without the functional layer 2 in the related art. In particular, since peeling of the printed material was particularly reduced when the average particle diameter of the resin particles 21 was about 1 μm or more, the average particle diameter of the resin particles 21 is preferably, for example, about 1 μm or more to reduce or prevent peeling of the printed material from occurring.

Example 3

A plurality of printing foundations 10 which differ from each other in the type of resin particle 21 included in the functional layer 2 were produced, and the characteristics were examined. Herein, three types of printing foundations 10 in which a cellulose resin, a polymethyl methacrylate ($\{CH_2C(CH_3)COOCH_3\}_n$), or a methyl methacrylate-ethylene glycol dimethacrylate copolymer was used as the resin of the resin particle 21 were prepared, and the presence or absence of a residue, a low-temperature reaction, the burn-off performance of the functional layer 2 at about 500° C., and the non-defective rate were examined. In this regard, the polymethyl methacrylate was used as an example of an acrylic resin other than the methyl methacrylate-ethylene glycol dimethacrylate copolymer. A crosslinked alkyl acrylate copolymer, a methacrylic acid ester polymer, or the like can be used, for example, as another example of the acrylic resin other than the methyl methacrylate-ethylene glycol dimethacrylate copolymer. The three types of printing foundations 10 were the printing foundation 10 according to the present preferred embodiment including the support 1 and the functional layer 2. The characteristics of the three types of printing foundations 10 are presented in Table 3.

TABLE 3

| | Residue | Low-temperature reaction | Burn-off performance | Non-defective rate |
|---|---|---|---|---|
| Cellulose resin | ○ | ○ | ○ | ○ |
| Polymethyl methacrylate | ○ | ⊙ | ⊙ | ⊙ |
| Methyl methacrylate-ethylene glycol dimethacrylate copolymer | ⊙ | ⊙ | ⊙ | ⊙ |

Herein, the residue is a material that is left after firing and that causes an unnecessary foreign substance. Therefore, it is preferable that the residue be reduced. In Table 3, the printing foundation that is usable regardless of presence of the residue is represented by "○", and the printing foundation that is stably usable due to a low degree of presence of the residue is represented by "⊙".

As presented in Table 3, it was determined that the three types of printing foundations 10 which differ from each other in the type of the resin particle 21 were usable regardless of presence of the residue. In particular, when the resin particle 21 is made of the methyl methacrylate-ethylene glycol dimethacrylate copolymer, the residue was particularly reduced. Therefore, to further reduce the residue after firing, the resin particle 21 is preferably made of, for example, the methyl methacrylate-ethylene glycol dimethacrylate copolymer.

In addition, when the functional layer 2 is heated and the temperature is increased to about 280° C., a reaction occurs, and the weight rapidly decreases. Herein, this reaction is referred to as a low-temperature reaction. In a degreasing step during production of a ceramic electronic component, a poor low-temperature reaction hinders shrinkage of the ceramic electronic component, and defects such as cracking may be caused. Therefore, a smooth low-temperature reaction is preferable. In Table 3, a printing foundation that is usable since shrinkage of the ceramic electronic component is not hindered regardless of variations in the degree of the low-temperature reaction is represented by "○", and a printing foundation that is stably usable due to a quick low-temperature reaction is represented by "⊙".

As presented in Table 3, it was determined that all of the three types of printing foundations 10 which differ from each other in the type of the resin particle 21 were usable although some exhibits variations in the degree of the low-temperature reaction. In particular, it was determined that when the resin particle 21 was made of the polymethyl methacrylate or made of the methyl methacrylate-ethylene glycol dimethacrylate copolymer, the low-temperature reaction was smooth and the printing foundation was stably usable. Since the polymethyl methacrylate or the methyl methacrylate-ethylene glycol dimethacrylate copolymer is a type of acrylic resin, when the low-temperature reaction in the degreasing step during production of a ceramic electronic component is regarded as important, it is preferable that the resin particle 21 is made of, for example, an acrylic resin.

In the firing step during production of the ceramic electronic component, firing is performed at a temperature of about 500° C. or higher. When the functional layer 2 is not burnt off during firing at about 500° C., shrinkage of the ceramic electronic component is hindered, and defects such as cracking may be caused. In table 3, the printing foundation that is usable since shrinkage of the ceramic electronic component is not hindered regardless of variations in the burn-off performance of the functional layer 2 heated to 500° C. is represented by "○", and the printing foundation that is stably usable due to high burn-off performance is represented by "⊙".

As presented in Table 3, it was determined that all of the three types of printing foundations 10 which differ from each other in the type of the resin particle 21 were usable although some exhibit variations in the burn-off performance of the functional layer 2. In particular, it was determined that when the resin particle 21 was made of the polymethyl methacrylate or made of the methyl methacrylate-ethylene glycol dimethacrylate copolymer, the burn-off performance of the functional layer 2 was high and the printing foundation was stably usable. Since the polymethyl methacrylate or the methyl methacrylate-ethylene glycol dimethacrylate copolymer is a type of acrylic resin, when the burn-off performance of the functional layer 2 in the firing step during production of the ceramic electronic component is regarded as important, it is preferable that the resin particle 21 is made of, for example, an acrylic resin.

The non-defective rate represents the non-defective rate of the printed material formed on the printing foundation 10 through printing by using an ink and represents the proportion of non-defective products having no defects such as cracking in a predetermined number (for example, 30) of products. In Table 3, the printing foundation that is usable due to a high non-defective rate is represented by "○", and the printing foundation that is stably usable due to a particularly high non-defective rate is represented by "⊙".

As presented in Table 3, it was determined that all of the three types of printing foundations 10 which differ from each other in the type of the resin particle 21 exhibited a high non-defective rate. In particular, it was determined that when the resin particle 21 was made of the polymethyl methacrylate or made of the methyl methacrylate-ethylene glycol dimethacrylate copolymer, the non-defective rate was high and the printing foundation was stably usable. Since the polymethyl methacrylate or the methyl methacrylate-ethylene glycol dimethacrylate copolymer is a type of acrylic resin, to further improve the non-defective rate of the printed material, it is preferable that the resin particle 21 is made of, for example, an acrylic resin.

Example 4

A plurality of printing foundations 10 which differ from each other in the type of support 1 were produced, and the characteristics were examined. Herein, three types of printing foundations 10 in which the support 1 having a porous structure was made of $Al_2O_3$, a compound of $Al_2O_3$ and $SiO_2$, or a compound of $Al_2O_3$, $SiO_2$, and MgO were prepared, and ink blurring, intrusion of the ink solid content into the support 1, peeling of the printed material from the functional layer 2, the non-defective rate of the printed material, the reusability of the printing foundation 10, and the quick-drying performance of the printed material were examined. The three types of printing foundations 10 were the printing foundation 10 according to the present preferred embodiment including the support 1 and the functional layer 2. The characteristics of the three types of printing foundations 10 are presented in Table 4.

The reusability of the printing foundation 10 was evaluated in accordance with criteria, for example, whether the degree of deformation of the printing foundation 10 is low, whether a foreign matter such as the ink solid content is included in the support 1, and whether a substance that repels the ink is attached to the surface of the support 1. Herein, a printing foundation that is reusable is represented by "○", and a printing foundation that exhibits particularly high reusability since the degree of deformation and the like of the printing foundation 10 is particularly low is represented by "⊙". Regarding the quick-drying performance of the printed material, a printing foundation that exhibits quick drying of the ink with respect to the printed material is represented by "○", and a printing foundation that exhibits particularly quick drying of the ink is represented by "⊙".

It was determined that all of the three types of printing foundations 10 presented in Table 4 exhibited a low degree of ink blurring compared with the printing foundation not provided with the functional layer 2 and made of $Al_2O_3$. In particular, it was determined that when the support 1 was made of a compound of $Al_2O_3$ and $SiO_2$ or a compound of $Al_2O_3$, $SiO_2$, and MgO, the degree of ink blurring was particularly low and an advantageous effect of reducing or preventing blurring from occurring was high. Therefore, to further reduce ink blurring with respect to the printing foundation 10 according to the present invention, it is preferable that the support 1 include, for example, a compound of $Al_2O_3$ and $SiO_2$ or a compound of $Al_2O_3$, $SiO_2$, and MgO.

It was determined that all of the three types of printing foundations 10 presented in Table 4 exhibited a low degree of intrusion of the ink solid content into the support 1 compared with the printing foundation without the functional layer 2 in the related art.

It was determined that all of the three types of printing foundations 10 presented in Table 4 exhibited a low degree of peeling of the printed material compared with the printing foundation not provided with the functional layer 2 and made of $Al_2O_3$. In particular, when the support 1 was made of a compound of $Al_2O_3$ and $SiO_2$ or a compound of $Al_2O_3$, $SiO_2$, and MgO, the degree of peeling of the printed material was particularly low. Therefore, to further reduce or prevent peeling of the printed material from occurring, it is prefer-

TABLE 4

|  | Blurring | Ink intrusion | Peeling | Non-defective rate | Reusability | Quick-drying performance |
|---|---|---|---|---|---|---|
| $Al_2O_3$ | ○ | ⊙ | ○ | ○ | ○ | ○ |
| $Al_2O_3$ + $SiO_2$ | ⊙ | ⊙ | ⊙ | ⊙ | ⊙ | ○ |
| $Al_2O_3$ + $SiO_2$ + MgO | ⊙ | ⊙ | ⊙ | ⊙ | ⊙ | ⊙ |

The printing foundation in which the support 1 is made of $Al_2O_3$ may include a secondary component. Similarly, the printing foundation in which the support 1 is made of a compound of $Al_2O_3$ and $SiO_2$ may include a secondary component, and the printing foundation in which the support 1 is made of a compound of $Al_2O_3$, $SiO_2$, and MgO may include a secondary component.

Regarding Table 4, the methods for evaluating ink blurring, intrusion of the ink solid content into the support 1, and peeling of the printed material from the functional layer 2 were similar to the methods with respect to Table 1. The method for evaluating the non-defective rate of the printed material was similar to the method with respect to Table 3.

able that the support 1 includes, for example, a compound of $Al_2O_3$ and $SiO_2$ or a compound of $Al_2O_3$, $SiO_2$, and MgO.

It was determined that all of the three types of printing foundations 10 presented in Table 4 exhibited a high non-defective rate of the printed material. In particular, when the support 1 was made of a compound of $Al_2O_3$ and $SiO_2$ or a compound of $Al_2O_3$, $SiO_2$, and MgO, it was determined that the non-defective rate of the printed material was particularly high. Therefore, to further improve the non-defective rate of the printed material, it is preferable that the support 1 includes, for example, a compound of $Al_2O_3$ and $SiO_2$ or a compound of $Al_2O_3$, $SiO_2$, and MgO. In this regard, when the support 1 includes a compound of $Al_2O_3$, $SiO_2$, and MgO, it is assumed that an influence on the printed material during firing is reduced since the thermal expansion coefficient is low so as to further increase the non-defective rate.

It was determined that all of the three types of printing foundations 10 presented in Table 4 exhibited high reusability. The reusability of the printing foundation 10 being improved enables the production cost when a ceramic electronic component including the printing foundation 10 is produced to be reduced. In particular, it was determined that when the support 1 was made of a compound of $Al_2O_3$ and $SiO_2$ or a compound of $Al_2O_3$, $SiO_2$, and MgO, the reusability was particularly high. Therefore, to further improve the reusability of the printing foundation 10, it is preferable that the support 1 includes, for example, a compound of $Al_2O_3$ and $SiO_2$ or a compound of $Al_2O_3$, $SiO_2$, and MgO.

In this regard, it is assumed that when the support 1 includes a compound of $Al_2O_3$ and $SiO_2$, deformation during firing is reduced or prevented from occurring due to high heat resistance so as to particularly increase the reusability. In addition, it is assumed that when the support 1 includes a compound of $Al_2O_3$, $SiO_2$, and MgO, deformation during firing is reduced or prevented from occurring due to high mechanical strength and high thermal shock resistance so as to particularly increase the reusability.

It was determined that all of the three types of printing foundations 10 presented in Table 4 exhibited high quick-drying performance of the printed material. In particular, it was determined that when the support 1 was made of a compound of $Al_2O_3$, $SiO_2$, and MgO, the quick-drying performance of the printed material was particularly high. Therefore, to further improve the quick-drying performance of the printed material, it is preferable that the support 1 includes, for example, a compound of $Al_2O_3$, $SiO_2$, and MgO.

Herein, when a product having a multilayer structure is produced by performing a plurality of times of printing on the printing foundation 10, it is necessary that printing for a layer and drying are performed and thereafter printing for the next layer is performed. When the printing foundation 10 according to the present preferred embodiment is used, since the quick-drying performance of the printed material is high, the time period until printing for the next layer can be reduced, and the production time of the product having a multilayer structure can be reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printing foundation comprising:
   a support having a porous structure; and
   a functional layer in contact with the support portion and including a plurality of resin particles including a surface at least portion of which is covered by polyvinyl alcohol; wherein
   at least a portion of the surface of the plurality of resin particles is not covered by the polyvinyl alcohol.

2. The printing foundation according to claim 1, wherein the resin particles include an acrylic resin.

3. The printing foundation according to claim 2, wherein the acrylic resin is a methyl methacrylate-ethylene glycol dimethacrylate copolymer.

4. The printing foundation according to claim 1, wherein the support includes $Al_2O_3$.

5. The printing foundation according to claim 1, wherein the support includes a compound of $Al_2O_3$ and $SiO_2$.

6. The printing foundation according to claim 1, wherein the support includes a compound of $Al_2O_3$, $SiO_2$, and MgO.

7. The printing foundation according to claim 1, wherein a thickness of the functional layer is about 5 μm or more.

8. The printing foundation according to claim 1, wherein the resin particles have a spherical or substantially spherical shape and an average particle diameter of the resin particles is about 1.8 μm or less.

9. The printing foundation according to claim 1, wherein the resin particles have rectangular or substantially rectangular parallelepiped shape.

10. The printing foundation according to claim 1, wherein the resin particles have a triangular or substantially triangular pyramid shape.

11. The printing foundation according to claim 1, wherein the resin particles have a cylindrical or substantially cylindrical column shape.

12. The printing foundation according to claim 1, wherein the resin particles have a circular or substantially circular cone shape.

13. The printing foundation according to claim 1, wherein the resin particles have irregular shapes.

14. The printing foundation according to claim 1, wherein the resin particles include an acrylic resin, a cellulose resin, or a polyvinyl butyral resin.

15. The printing foundation according to claim 1, wherein the polyvinyl alcohol includes at least one of methanol or methyl acetate as an impurity.

* * * * *